United States Patent
Agarwal et al.

(10) Patent No.: US 9,208,475 B2
(45) Date of Patent: Dec. 8, 2015

(54) APPARATUS AND METHOD FOR EMAIL STORAGE

(75) Inventors: Vivek Agarwal, Marlborough, MA (US); Shwetha Jois, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1462 days.

(21) Appl. No.: 12/482,475

(22) Filed: Jun. 11, 2009

(65) Prior Publication Data

US 2010/0318612 A1   Dec. 16, 2010

(51) Int. Cl.
*G06Q 10/10*   (2012.01)

(52) U.S. Cl.
CPC ................................ *G06Q 10/107* (2013.01)

(58) Field of Classification Search
USPC ............................................................ 709/206
See application file for complete search history.

(56) References Cited

U.S. PATENT DOCUMENTS

| | | | |
|---|---|---|---|
| 2002/0040370 A1* | 4/2002 | Entwistle | 707/205 |
| 2002/0071546 A1* | 6/2002 | Brennan | 379/379 |
| 2004/0073617 A1* | 4/2004 | Milliken et al. | 709/206 |
| 2004/0078437 A1* | 4/2004 | Guillemin | 709/206 |
| 2004/0267553 A1* | 12/2004 | Brunton | 705/1 |
| 2005/0108227 A1* | 5/2005 | Russell-Falla et al. | 707/5 |
| 2005/0204001 A1* | 9/2005 | Stein et al. | 709/206 |
| 2007/0055715 A1* | 3/2007 | Achiwa | 707/204 |
| 2007/0168430 A1* | 7/2007 | Brun et al. | 709/206 |
| 2009/0132490 A1* | 5/2009 | Okraglik | 707/3 |
| 2010/0077041 A1* | 3/2010 | Cowan et al. | 709/206 |
| 2010/0211644 A1* | 8/2010 | Lavoie et al. | 709/206 |
| 2010/0274628 A1* | 10/2010 | Kunz et al. | 705/10 |

OTHER PUBLICATIONS

Clark, James et al. "A Neural Network Based Approach to Automated E-mail Classification", IEEE Xplore, 2003, pp. 1-4, http://ieeexplore.ieee.org/stamp/stamp.jsp?tp=&arnumber=1241300&tag=1.*

* cited by examiner

*Primary Examiner* — Angela Nguyen

(74) *Attorney, Agent, or Firm* — HGF Limited

(57) ABSTRACT

Embodiments of the present invention provide an apparatus for storing emails, comprising a neural network arranged to receive information associated with an email, to determine a storage location of the email according to one or more of the attributes of the email and to output information identifying the determined storage location.

20 Claims, 4 Drawing Sheets

171

| 210 | | | | 220 |
|---|---|---|---|---|
| 230 | 240 | 250 | 260 | 270 |

300

APPARATUS AND METHOD FOR EMAIL STORAGE

BACKGROUND

Email is a widely used form of communication. It has been estimated that two million emails are sent every minute in the United Kingdom alone, and the volume of emails sent is expected to continue to rise. The storage of emails, particularly within organisations, having numerous email users, is particularly costly.

It is an object of embodiments of the invention to at least mitigate one or more of the problems of the prior art.

BRIEF DESCRIPTION OF THE DRAWINGS

Embodiments of the invention will now be described by way of example only, with reference to the accompanying figures, in which.

DETAILED DESCRIPTION OF EMBODIMENTS OF THE INVENTION

Embodiments of the present invention store emails in one of a plurality of email storage locations according to information associated with each email. A storage tier for a received email is determined by a neural network according to one or more predetermined criteria. In some embodiments, information identifying the storage tier of the email is stored to facilitate retrieval of the email. Embodiments of the invention will now be described.

Figure 1:
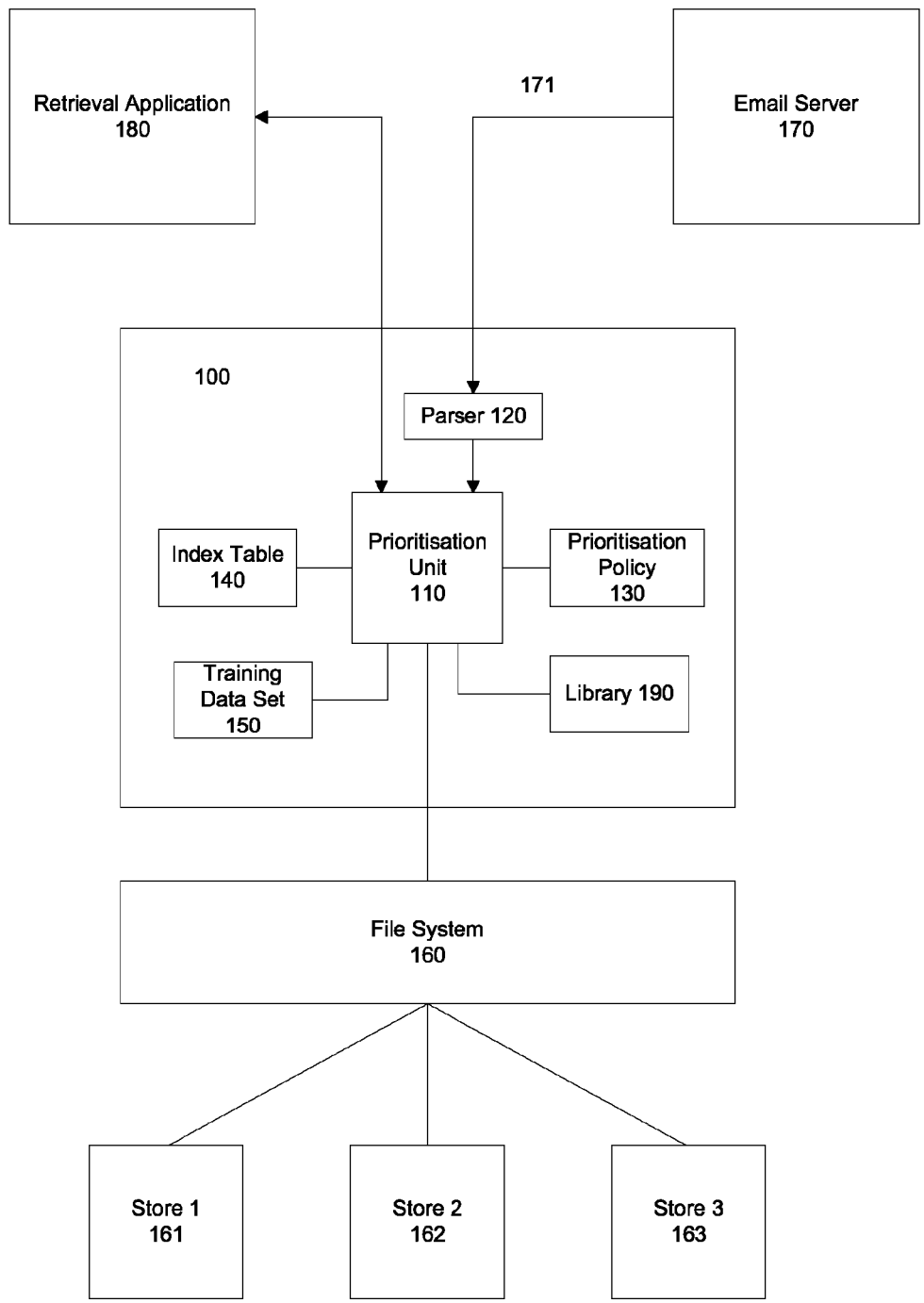
FIG. 1 illustrates an apparatus according to an embodiment of the invention.

An apparatus 100 for determining a storage location for an email according to an embodiment of the invention is illustrated in FIG. 1. The apparatus 100 comprises a prioritisation unit 110 and a parser 120. The parser 120 is arranged to parse an email 171 received from a source, such as an email server 170, and to output one or more parsed fields of the email 171 to the prioritisation unit 110. The prioritisation unit 110 determines a priority of the email 171 according to a prioritisation policy 130 and selects a storage location for the email 171 according to the determined priority. Information identifying the storage location of the email 171 is stored in an index table 140 by the prioritisation unit 110. The prioritisation unit 110 outputs information identifying the selected storage location to a file system 160. The file system 160 stores the email 171 in the determined one of a plurality of stores 161, 162, 163 selected by the prioritisation unit 110. The apparatus 100 further comprises, in some embodiments, a training data set 150 for training the prioritisation unit 110 to determine the priority of emails, as will be explained. The prioritisation unit 110 is further arranged to retrieve an email requested by, for example, a retrieval application 180, which requests access to the email 171. The prioritisation unit 110 determines the storage location of the requested email using the index table 140. Embodiments of the apparatus 100 may further comprise a library 190 which is used to store information associated with each received email processed by the prioritisation unit 110 for use in a training operation, as will be explained.

As noted above, the file system 160 supports the plurality of stores 161, 162, 163 for storing emails therein. It is envisaged that each store 161, 162, 163 is a storage tier having a particular storage characteristic. For example, a first storage tier 161 may be a highly-redundant storage tier, for example implemented by RAID 1 storage. The first storage tier 161 may be used to store important or high priority emails. A second storage tier 162 may be a low-cost storage tier, for example RAID 5, which may be used to store emails deemed to have a low priority. The third storage tier 163 may be a high-speed storage tier, for example RAID 0. In this way, the file system 160 and associated stores 161, 162, 163 provide a plurality of different storage locations each having associated characteristics. It will be realised that the number and specifications of the storage tiers 161, 162, 163 may be selected as appropriate.

Figures 2, 3:
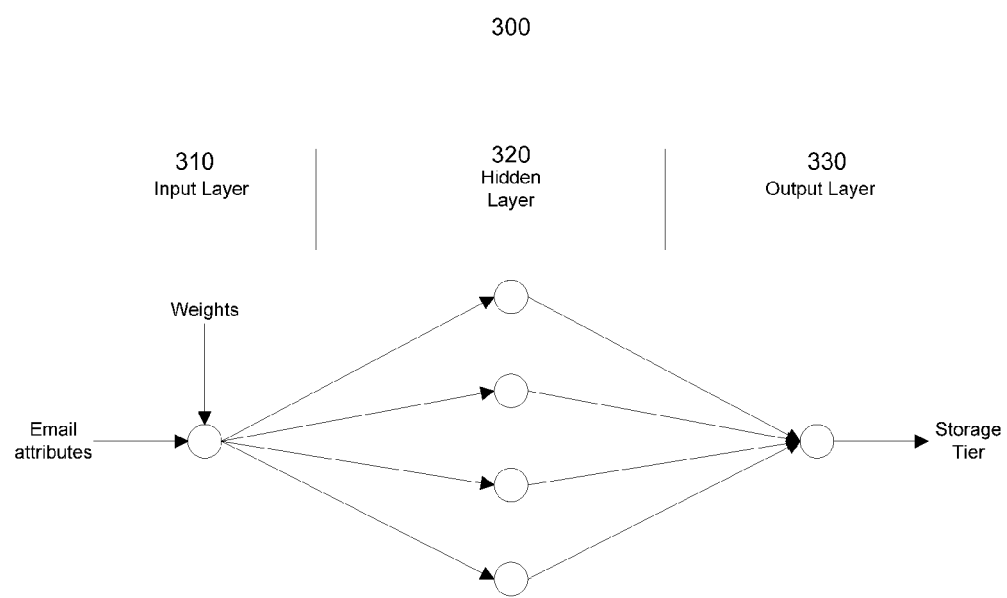
FIG. 2 illustrates a structure of an email.
FIG. 3 illustrates an embodiment of a neural network.

FIG. 2 illustrates a structure of the email 171 output by the email server 170 in FIG. 1. The email 171 may have a structure as defined in one of RFCs 822 or 2822, or any other standard defining an email structure. The email 171 comprises a header part 210 and a body part 220. The header part 210 includes a plurality of header fields 230, 240, 250, 260 and the body part 220 includes a body 270 of the email which contains, for example, ASCII text. Whilst the email 171 shown in FIG. 2 comprises four header fields 230, 240, 250, 260 it will be realised that this is merely exemplary and that the header part 210 may comprise any other number of header fields 230, 240, 250, 260. According to RFCs 822 and 2822 the header fields 230, 240, 250, 260 are separated by a carriage return and line feed pair, commonly referred to as CRLF. The body 270 is separated from the last header field 260 by an empty line.

In one embodiment, only the header fields 230, 240, 250, 260 of the email 171 are communicated to the parser 120. However, in other embodiments, the entire email 171 is communicated to the parser 120. The parser 120 is arranged to parse the header 210 of the email 171 and output one or more of the header fields 230, 240, 250, 260 to the prioritisation unit 110. The parser 120 may also determine further information about the email 171, such as information not defined in the header 210, and communicate the determined information to the prioritisation unit 110.

The parser 120 may select one or more predetermined header fields 230, 240, 250, 260 which are required by the prioritisation unit 110 from those header fields 230, 240, 250, 260 associated with the email 171 and pass only the required header fields 230, 240, 250, 260 to the prioritisation unit 110. Furthermore, since header fields 230, 240, 250, 260 of the email 171 may be present in the email header 210 in any order, the parser 120 may pass the header fields 230, 240, 250, 260 to the prioritisation unit 110 in a predetermined order. Still further, the parser 120 may be arranged to determine one or more attributes of the email 171, such as a total size of the email 171, for which there may not be an explicit header 210 field and pass information identifying one or more attributes of the email 171 to the prioritisation unit 110. In other embodiments of the invention, one or more parsed fields of the header 230, 240, 250, 260 may be received from the email server 170 i.e. the email server 170 may perform the parsing of the email 171 and pass the parsed information directly to the apparatus 100.

The information output by the parser 120 may include one or more of: originator information identifying the sender of the email 171, origination date information indicating the origination date of the email 171 i.e. when the email 171 was sent, size information indicating a size of the email, recipient information indicating the recipient of the email, recipient field information indicating whether the recipient is identified in the to, copy or blind-carbon-copy field of the email 171, forwarding information indicating whether the email is original or is being forwarded and/or importance information indicating an importance or priority of the email i.e. a value of an X-priority field set in the email header 210 by the sender of the email 171.

As mentioned above, the prioritisation unit 110 is arranged to determine a storage location for the email 171 based upon at least some of the information received from the parser 120 and the prioritisation policy 130.

The prioritisation policy 130 represents an organisation's policy for determining email storage locations. The prioritisation policy 130 may be defined by a system administrator and defines which email attributes have a bearing on the determination of storage location. In other words, the prioritisation policy 130 defines criteria by which the storage location for each email is chosen. The prioritisation policy 130 may be held in a storage device accessible by the prioritisation unit 110, such as a memory or other storage device.

In some embodiments, the prioritisation policy 130 is a mark-up-language file such as an XML file. The prioritisation policy 130 may be updated periodically as the organisation's selection criteria for email storage change. Factors upon which the prioritisation policy 130 may be determined include: importance i.e. the priority with which the email 171 was sent; the age of the email 171; the sender of the email 171 i.e. according to one or more lists of senders; retrieval frequency i.e. an anticipated frequency of retrieving the email; the size of the email 171; an anticipated time before the email 171 is archived or deleted. It will be realised that the determination of the prioritisation policy 130 may also be based upon other factors.

The prioritisation policy 130 includes a weight value for one or more attributes of the email 171. The prioritisation policy 130 may define a relative weight of various attributes of the email 171. The weight value may be an integer value within a predetermined range of integer values. For example, the weight value may range between 1 and 5, defining a relative importance of the attribute to selecting the storage tier. Table 1 provides example weight values for five email attributes:

TABLE 1

| Attribute | Weight |
|---|---|
| Importance | 5 |
| Sender | 1 |
| Forwarded | 4 |
| Age > predetermined age | 3 |
| Size > 2 MB | 2 |

The example weight values in Table 1 indicate that, for an example organisation, the importance of an email i.e. the x-priority value set in the email header 210 by the sender of the email 171 is relatively more important than whether the email is forwarded or has been directly sent to the recipient. Similarly, whether an email 171 is over 2 Mb in size is relatively more important than the identity of the sender. Whilst weight values of 1 (least important) to 5 (most important) have been shown, it will be realised that any other range or number of weight values may be used.

The prioritisation policy 130 may also contain a rating, or weight value, for each storage tier for each attribute. The rating indicates that storage tier's suitability for that email attribute. For example, the rating may be an integer between 0 (no fit or least suitable) and 4 (excellent fit or most suitable), although it will be realised that other values and ranges may be used. Furthermore, the ratings or weights for each storage tier do not necessarily have to be in the same range as the weights for the email attributes. Example ratings for three storages tiers (tiers 1-3) are shown in table 2.

TABLE 2

| Attribute | Storage Tier 1 Weight | Storage Tier 2 Weight | Storage Tier 3 Weight |
|---|---|---|---|
| Importance | 4 | 2 | 0 |
| Sender | 0 | 1 | 4 |
| Forwarded | 2 | 3 | 2 |
| Age > predetermined age | 1 | 3 | 2 |
| Size > 2 MB | 2 | 4 | 1 |

Table 2 indicates that the most suitable storage tier for important emails (only considering the importance attribute), i.e. those having the x-priority field set by the email sender, is tier 1 whilst tier 3 is the least suitable.

A decision matrix, as shown below in Table 3, can be used to show a comparison of the storage tiers by scoring each tier based upon the weight of each email attribute and the rating of each storage tier for that attribute.

TABLE 3

| Decision Model | | Storage Alternatives | | | | | |
|---|---|---|---|---|---|---|---|
| | | Storage Tier 1 | | Storage Tier 2 | | Storage Tier 3 | |
| Attribute | Weight | Rating | Score | Rating | Score | Rating | Score |
| Importance | 5 | 4 | 20 | 2 | 10 | 0 | 0 |
| Sender | 1 | 0 | 0 | 1 | 1 | 4 | 4 |
| Forwarded | 4 | 2 | 8 | 3 | 12 | 2 | 8 |
| Age | 3 | 1 | 3 | 3 | 9 | 2 | 6 |
| Size | 2 | 2 | 4 | 4 | 8 | 1 | 2 |
| Total | 15 | 9 | 35 | 13 | 40 | 9 | 20 |

As can be seen from Table 3 the score indicates the combined importance of that attribute and suitability of the respective storage tier for that attribute. For example, for important emails, i.e. those indicating to be important by the x-priority field of the email 171, storage tier 1 is more suitable than storage tier 2 and storage tier 3 is deemed the least suitable for storing important emails. However, a summation of all of the scores indicates that overall tier 2 is the most likely storage tier to be chosen.

The prioritisation unit 110 comprises a neural network 300 for determining the storage tier of an email 171, a schematic illustration of which is shown in FIG. 3. The neural network 300 may be a software-based simulation of a feed forward neural network. A single node input layer 310 of the neural network 300 is provided with one or more attributes of the email 171 from the parser 120 and information in the form of weights from the prioritisation policy 130. The input attributes of the email 171 are one or more header fields 230, 240, 250, 260. Modules of the neural network 300 execute in parallel to simulate a hidden layer 320 of the neural network 300 and are coordinated at a single node output layer 330. The output of the neural network 300 is information indicating the storage tier selected for the respective email. As will be explained, the neural network 300 is trained to select an appropriate storage tier for the email 171 by processing of the training data set 150. Based upon this prior learning, the neural network 300 determines an appropriate storage tier for each received email 171 and outputs information from the output layer 330 indicating the selected storage tier.

In order to facilitate later retrieval of each email, the prioritisation unit 110 stores information indicating the respective storage tier of each email in the index table 140. The index table 140 may be implemented as a hash table which, for example, maps a time stamp of each email to an appropriate storage tier to enable retrieval of each email. When an email is requested to be retrieved from its storage location by a retrieval application 180, information identifying the email is provided to the prioritisation unit 110 which references the index table 140 and obtains the storage location i.e. information identifying the storage tier of the email. In one embodiment, the prioritisation unit 110 retrieves the storage tier of the email using the email's time stamp as a key to the hash table. The email may then be retrieved either by the prioritisation unit 110 or information indicating the storage location returned to the retrieval application 180 by the prioritisation unit 110 for direct retrieval of the email by the retrieval application 180.

A method 400 of determining a storage location of an email according to an embodiment of the invention will now be described with reference to FIG. 4 which starts in step 410. An email 171 is received in step 420, for example from the email server 170. In step 430 the header 210 of the email 171 is parsed. The header 210 of the email is parsed to obtain one or more of the email header fields 230, 240, 250, 260 from the email 171, at least partly according to which a storage tier for the email is determined. In step 440 a storage location for the email 171 is determined based upon the information obtained in step 430 and the prioritisation policy 130. In step 450 information indicating the determined storage location is stored in the index table 140 to facilitate later retrieval of the email 171. In step 460 the email is moved to the determined storage location. The method ends in step 470.

Figure 4:
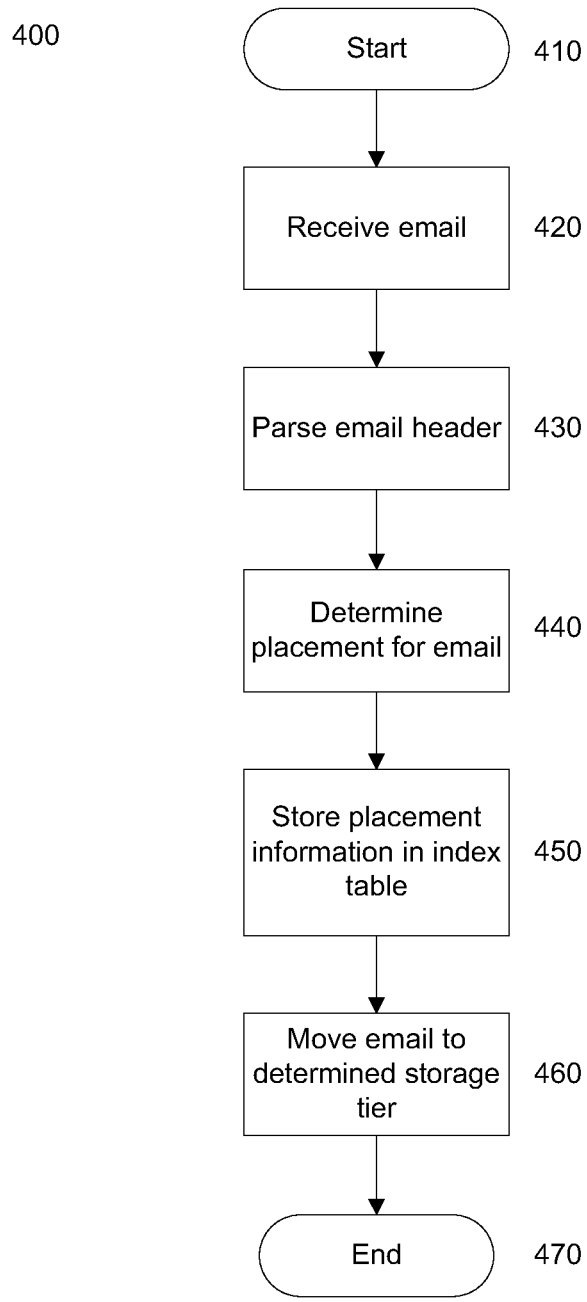
FIG. 4 illustrates a method according to an embodiment of the invention.

In some embodiments of the method shown in FIG. 4, a further step may be included in the method 400 in which information regarding the email i.e. one or more header fields 230, 240, 250, 260 obtained in step 430 are stored in the library 190. Furthermore, in some embodiments, information identifying the determined storage tier is stored in the library 190 associated with the email header fields 230, 240, 250, 260. The library 190 may be used in a method of training the neural network 300 as will be explained.

Figure 5:
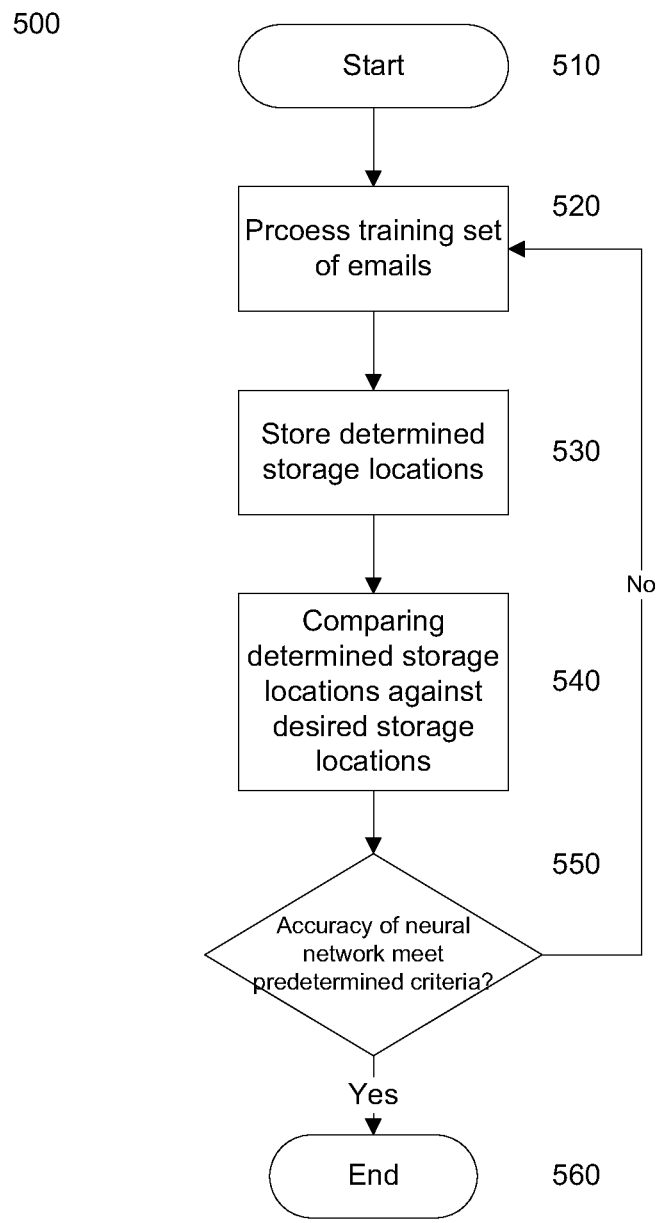
FIG. 5 shows a method of training the neural network according to an embodiment of the invention.

FIG. 5 illustrates a method of training the neural network 300 to select an appropriate storage tier for an email. As noted above, the exemplary apparatus 100 illustrated in FIG. 1 includes a training data set 150 for use in training the neural network 300. It will be realised that, in other embodiments of the invention, the training data set 150 may be provided to the apparatus 100 only during training of the neural network 300, for example on a portable storage device. Training of the neural network may take place prior to the neural network 300 being used to determine the storage location for a first email, or subsequent to the neural network 300 having determined the storage location for one or more emails. The training of the neural network 300 to determine the storage location of the email may be based upon a training data set 150 having a plurality of email attributes.

The training data set 150 includes a plurality of groups of sample inputs to the neural network 300, e.g. email header fields 230, 240, 250, 260. An iterative supervised training process is performed by the neural network 300 to determine a storage location for each group of sample inputs. The determined storage locations are then compared against correct storage locations for those inputs which have been determined either manually or by an automated process. The result of the comparison indicates whether the neural network 300 correctly determines the storage location based upon the sample inputs. The training process either then finishes if the comparison indicates a predetermined degree of accuracy in the neural network determining the storage location, or the processing of the training data set 150 is repeated following adjustment of the neural network's weights and thresholds.

FIG. 5 illustrates an embodiment of the method 500 of training the neural network 300. The method 500 begins in step 510. In step 520 the neural network 300 processes the training data set 150 to determine storage locations for the sample inputs in the training data set 150. In step 530 the output of the neural network 300 is stored for comparison in step 540. Information identifying the determined storage locations corresponding to the sample groups of inputs in the training data set may be stored in a storage device accessible by the apparatus 100. In step 550 it is determined whether the storage locations determined by the neural network 300 are within a predetermined error level of the desired or correct storage locations. The desired or correct storage location corresponding to each group of inputs in the training data set 150 may be determined manually i.e. by an administrator of the apparatus 100, or by automated processing of the training data set 150 e.g. by computer software to generate information indicating the desired storage locations. The deviation between the storage locations determined by the neural network 300 and the desired storage locations may be determined as a Mean Squared Error (MSE). If it is determined in step 550 that the neural network 300 error is greater than the predetermined error level then processing moves back to step 520, wherein information associated with the error is fed back to the neural network 300 and the training set 150 is further processed by the neural network 300. In step 550, the MSE may be compared against a predetermined MSE representative of satisfactory operation of the neural network. However, if the error is lower than the predetermined level, the method ends in step 560.

The process described with reference to FIG. 5 may be repeated one or more times until the MSE is reduced to lower than the predetermined MSE. With each iteration of the method shown in FIG. 5, the MSE is expected to decrease as the neural network 300 predication capability increases. However, it is envisaged that the predetermined MSE should not be set too low to avoid overtraining, whereby the neural network 300 becomes fitted precisely to the training data set 150 and avoids generalisation.

As mentioned above, the library 190 may, in some embodiments, store information associated with emails previously processed by the neural network. In order to avoid overtraining, information in the library 190 may be used in the training method 500 to introduce new data into the training of the neural network 300.

Embodiments of the present invention provide an apparatus and method for determining the storage location of an email according to information associated with the email. The storage location may also be determined with respect to the characteristics of one or more storage locations available for storing the email. Advantageously, the storage location of an email may be determined according to one or more of a likelihood of the email being required frequently, a storage cost of the email being reduced, the email being required to be stored with increased reliability.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. An apparatus for storing an email, comprising:
a neural network arranged to receive information associated with an email to determine a storage location comprising selecting a storage tier to store the email according to a plurality of attributes of the email and based on email attribute weights, wherein the plurality of attributes are derived from at least header fields of the email, and the neural network to output information identifying the determined storage location to a file system for storing the email in the determined storage location, wherein the neural network is trained by processing a training data set to determine the storage location; and
a parser for receiving a header of the email and outputting the header fields of the email to the neural network.

2. The apparatus of claim 1, comprising:
a storage device having stored therein the email attribute weights each associated with an attribute of the email, and wherein the training data set comprises sample inputs.

3. The apparatus of claim 1, wherein the storage location of the email is selected from amongst a plurality of storage locations each having one or more predetermined characteristics, and wherein the neural network is trained based on sample inputs of email attributes.

4. The apparatus of claim 1, comprising:
an index table for storing information identifying the email and the determined storage location of the email, and wherein processing the training data set is iterative.

5. The apparatus of claim 1, wherein the attributes of the email according to which the neural network determines the storage location to store the email comprise a priority field of the email, sender information associated with the email, a size of the email, and recipient field information indicating which field of the email identifies the recipient of the email.

6. The apparatus of claim 1, wherein the neural network is trained to within a predetermined error level of determining a correct storage location.

7. The apparatus of claim 1, wherein the neural network is trained to a predetermined degree of accuracy in determining a desired storage location.

8. The apparatus of claim 2, wherein the storage device has stored therein storage location weights each associated with a characteristic of a storage location comprising a storage tier, wherein the neural network to determine the storage location of the email further based on the storage location weights.

9. The apparatus of claim 3, wherein each storage location is a storage tier implemented by one or more storage devices, and wherein the training data set comprises the sample inputs of email attributes.

10. The apparatus of claim 4, wherein the index table is a hash table, wherein an attribute of the email act as a key to the hash table.

11. A method of storing an email, comprising:
receiving an email;
parsing a header of the received email and providing to a neural network, header fields as attributes of the email;
determining, by a neural network, a storage location comprising a storage tier to store the email based upon the attributes of the email and on email attribute weights;
storing the email in the determined storage location; and
training the neural network to determine the storage location to store the email based upon a training data set.

12. The method of claim 11, comprising:
providing to the neural network the email attribute weights associated with the attributes of the email.

13. The method of claim 11, comprising:
providing to the neural network a storage location attribute weight associated with a characteristic of the storage location, wherein the neural network is arranged to determine the storage location of the email further based on the storage location attribute weight.

14. The method of claim 11, comprising:
storing information identifying the storage location of the email in an index table.

15. The method of claim 11, wherein training comprises training the neural network to determine the storage location of the email within a predetermined error level, and wherein the training data set comprises a plurality of email attributes.

16. The method of claim 11, wherein attributes of the email according to which the neural network determines the storage location of the email include a priority field of the email, sender information associated with the email, a size of the email, and recipient filed information indicating which field of the email identifies the recipient of the email.

17. The method of claim 14, comprising:
receiving a request for the email; and
determining the storage location of the email from the index table to retrieve the email.

18. An apparatus, comprising:
a plurality of storage tiers, each storage tier having respective characteristics;
an email receiving means for receiving an email;
a storage location determining means including a neural network for selecting one of the storage tiers according to attributes of the email and the characteristics of each storage tier and outputting information identifying the selected storage tier, wherein the neural network is trained by processing a training data set of sample inputs to select one of the storage tiers;

a parsing means for parsing at least a header of the received email and providing to the neural network header fields as the attributes of the email; and email storing means for receiving the information identifying the selected storage tier and storing the email in the selected storage tier in response thereto.

19. The apparatus of claim 18, comprising:

email location storage means for storing information identifying a storage location of an email;

wherein the storage location determining means is arranged to store in the email location storage means information identifying the email and the storage location of the email.

20. The apparatus of claim 18, wherein the respective characteristics of the plurality of storage tiers include a cost of data storage, a speed of data storage and an availability of data storage, and wherein the sample inputs comprise email attributes.

\* \* \* \* \*